US008295541B2

(12) United States Patent
Naylor et al.

(10) Patent No.: US 8,295,541 B2

(45) Date of Patent: Oct. 23, 2012

(54) SYSTEM AND METHOD FOR DETECTING A CHANGE IN AN OBJECT SCENE

(75) Inventors: Matthew John Naylor, Myrtle Bank (AU); Matthew Paul Fettke, Morphettville (AU); Neil Cameron Thatcher, Redwood Park (AU); Andrew Lennox Davis, Erindale (AU)

(73) Assignee: Vision Fire & Security Pty Ltd, Victoria (AU)

( * ) Notice: Subject to any disclaimer, the term of this patent is extended or adjusted under 35 U.S.C. 154(b) by 1179 days.

(21) Appl. No.: 11/571,476

(22) PCT Filed: Jun. 30, 2005

(86) PCT No.: PCT/AU2005/000955

§ 371 (c)(1),
(2), (4) Date: Apr. 11, 2007

(87) PCT Pub. No.: WO2006/002466

PCT Pub. Date: Jan. 12, 2006

(65) Prior Publication Data

US 2007/0230798 A1 Oct. 4, 2007

(30) Foreign Application Priority Data

Jun. 30, 2004 (AU) ................................ 2004903572
Jul. 23, 2004 (AU) ................................ 2004904053
Nov. 23, 2004 (AU) ................................ 2004906689

(51) Int. Cl.
*G06K 9/00* (2006.01)

(52) U.S. Cl. ........................................................ 382/103

(58) Field of Classification Search .......... 382/103–107; 348/169–171

See application file for complete search history.

(56) References Cited

U.S. PATENT DOCUMENTS

| | | | | |
|---|---|---|---|---|
| 4,922,093 | A | 5/1990 | Fardeau et al. | |
| 4,991,223 | A * | 2/1991 | Bradley | 382/165 |
| 6,014,183 | A * | 1/2000 | Hoang | 348/702 |
| 2002/0024446 | A1 * | 2/2002 | Grech-Cini | 340/628 |
| 2003/0227548 | A1 * | 12/2003 | Kawakami et al. | 348/152 |
| 2004/0189510 | A1 * | 9/2004 | Negro et al. | 342/28 |
| 2005/0031201 | A1 * | 2/2005 | Goh | 382/169 |
| 2006/0251328 | A1 * | 11/2006 | Boo | 382/220 |
| 2007/0054350 | A1 * | 3/2007 | Walker | 435/34 |
| 2009/0033745 | A1 * | 2/2009 | Yeredor et al. | 348/152 |
| 2009/0232412 | A1 * | 9/2009 | Hutchinson et al. | 382/274 |

FOREIGN PATENT DOCUMENTS

| | | | |
|---|---|---|---|
| EP | 0 261 917 | A2 | 3/1988 |
| GB | 2045 493 | A | 2/1980 |
| GB | 2 150 724 | A | 7/1985 |
| GB | 2 282 294 | A | 3/1995 |
| GB | 2 308 260 | A | 6/1997 |
| JE | 8-265740 | | 10/1996 |

(Continued)

*Primary Examiner* — Atiba O Fitzpatrick

(74) *Attorney, Agent, or Firm* — Sughrue Mion, PLLC

(57) ABSTRACT

Method and apparatus for detecting change of an object state from an initial state where the object is displayed in a plurality of sequential images. The system involves comparing a measure over a predetermined portion of each of the images corresponding to an object's initial state with a reference value of the measure computed when the object is in the initial state to generate a comparison value for each of the images and then generating a signal indicating that the object state has changed when a predetermined number of the comparison values generated for each of the images do not meet a predetermined criterion.

20 Claims, 6 Drawing Sheets

FOREIGN PATENT DOCUMENTS

| | | | |
|---|---|---|---|
| WO | WO 99/23626 | | 5/1999 |
| WO | WO 02/32129 | A1 | 4/2002 |
| WO | WO 03/001467 | A1 | 1/2003 |
| WO | WO 2004/079681 | A1 | 2/2004 |

* cited by examiner

SYSTEM AND METHOD FOR DETECTING A CHANGE IN AN OBJECT SCENE

FIELD OF THE INVENTION

The present invention relates to image processing. In one particular form the invention relates to a method of determining whether an object, situated in a region of interest and viewed in a sequence of images is located in an expected position or has moved, been tampered with or otherwise altered.

In another form the present invention relates to a detection system, which in one example relates to a security system capable of monitoring whether a detector forming part of the security system has undergone tampering. It will be convenient to hereinafter describe this embodiment of the invention in relation to the use of a passive infra-red (PIR) detector in a security system. However, it should be appreciated that the present invention is not limited to the embodiments and applications that are described herein.

BACKGROUND OF THE INVENTION

Video camera systems have long been used to monitor areas or regions of interest for the purposes of maintaining security and the like. One important application is the use of video camera systems to monitor sensitive areas in locations such as museums or art galleries which include valuable items that could be potentially removed by a member of the public. Typically such a system would include a number of video cameras which would be monitored by a security attendant. In this human based scenario, the attendant would be relied on to detect any changes in the areas being viewed by each of the individual cameras. Clearly, this approach has a number of significant disadvantages. Notwithstanding the expense of the labour involved, this approach is prone to human error as it relies on the ability of the attendant to detect that a change of significance has occurred within the area being viewed by the camera without being distracted by any other visual diversion.

With the advent of more sophisticated image processing algorithms, and the associated computer hardware to implement these algorithms in real time, a number of attempts have been made to automate this process. A naïve approach to this problem includes the direct comparison of either individual or groups of pixel intensities of subsequent sequential images or frames which make up a digital video signal. If the difference between a group of pixels over a number of sequential images is found to be over some threshold then an alarm is generated indicating that movement has occurred within the area being viewed by the camera. Clearly, this naïve approach when applied to a viewing area which naturally includes a subset of objects moving within it (e.g. patrons at a museum) and a number of stationary items (e.g. museum exhibits) fails as the movement of patrons will trigger the alarm.

One attempt to overcome this disadvantage is to apply background modelling techniques to the subsequent images or frames corresponding to the area being viewed by the camera. In this approach, portions of the image which do not change substantially from normal from image to image are determined to be part of the background. In the example of an art gallery or museum, the paintings or artefacts would form part of the "background" of an image as they are stationary in the subsequent images or frames of the digital video signal. If one of the "background" pixels corresponding to an artefact has an intensity which varies above a predetermined threshold then this pixel is in alarm condition. However, as would be appreciated by those skilled in the art, this approach is extremely sensitive to pixel intensity changes as would typically be caused by lighting changes resulting from shadows, time of day variation and other ambient light variation. Whilst some of these effects can be compensated by employing a more sophisticated background model, this also increases the overall complexity and tuning requirements of the surveillance system. Another disadvantage of the background modelling approach and other prior art detection systems is that they fail where there is a temporary total occlusion of an object of interest or in the case where there is permanent partial occlusion of the object.

In a related area of application, various detection or monitoring systems which may be arranged to provide security or detect and measure the behaviour of objects within a field of view or detection region of the system are well-known. Examples range from Doppler radar detectors used to measure or detect a characteristic such as the speed of vehicles and active beam detectors which measure or detect a characteristic such as the reflection of an incident beam off an object to devices such as passive infra-red (PIR) detectors which measure the characteristic of heat emanated by objects and are often used in security applications. A requirement of each of these devices is that they may be orientated to inspect a predetermined field of view which corresponds to the detection region of the device.

Clearly, the performance of these devices may be degraded or totally compromised if the actual field of view or detection region is different from that assumed during initial setup. In the example of a Doppler radar detector, the characteristic of speed calculated by the device will depend on the angle of travel of the moving vehicle with respect to the orientation of the detector and errors in setup may result in erroneous results.

In the example of a PIR detector, this device may typically be located and adjusted to view regions which are required to be kept secure such as an entranceway to a building or the like. If in fact the PIR detector is not pointing in the correct direction, a person moving along the viewed entranceway may not be detected, as they may not be within the field of view of the detector.

This illustrates a significant disadvantage with devices of this nature which have a detection region set by the orientation of the device. A person wishing to gain access to a building may during the day, when the PIR detector is inactive, change the detecting direction of the device so that it no longer points towards or views a given detection region. Accordingly, when the device becomes operative at night it may no longer be pointing in the correct direction thereby allowing an intruder to potentially gain access to the building. Similarly, a radar detector which has been positioned to detect the speed of vehicles moving in a given direction may provide incorrect results if it has been tampered with by changing its detecting direction.

Any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure herein.

It is an object of the present invention to provide a method that enables detection of an object in a sequence of images which compensates for temporary total occlusion of the object.

It is a further object of the present invention to provide a method that enables detection of an object in a sequence of images which compensates for permanent partial occlusion of the object.

It is yet still a further object of the present objection to provide a method which can be implemented in real time on a digital video system or signal.

It is also an object of the present invention to provide a detection system capable of monitoring its operation and hence whether tampering or at least unauthorised alteration of the system has taken place.

SUMMARY OF THE INVENTION

In a first aspect the present invention accordingly provides a method of detecting change of an object state from an initial state, said object displayed in a plurality of sequential images, said method comprising:

- comparing a measure over a predetermined portion of each of said images corresponding to an object's initial state with a reference value of said measure computed when said object is in said initial state to generate a comparison value for each of said images; and
- generating a signal indicating that said object state has changed when a predetermined number of said comparison values generated for each of said images do not meet a predetermined criterion.

Preferably, said measure is substantially illumination invariant.

Preferably, said substantially illumination invariant measure is derived from edge characteristics of said object.

Preferably, plurality of sequential images forms a digital video signal.

In a second aspect the present invention accordingly provides a method of detection comprising the steps of:

- determining a reference image of an object scene comprising a recording of at least one object image feature;
- determining an updated/actual/current image of the object scene comprising a recording of at least one object image feature;
- comparing the reference and updated/actual/current images in accordance with a predetermined comparison metric;
- invoking an alarm condition when a result of the step of comparing meets one or more of a set of predefined criteria.

Preferably the set of predefined criteria comprises:

a) the predetermined comparison metric indicates a threshold proportion of the updated/actual/current image does not match the corresponding proportion of the reference image;

b) a portion of the updated/actual/current image does not match the corresponding portion of the reference image during a continuous time interval.

In a third aspect the present invention accordingly provides a method of detection comprising the steps of:

- determining a reference image of an object scene comprising a recording of at least one object image feature;
- determining an updated/actual/current image of the object scene comprising a recording of at least one object image feature;
- comparing the updated/actual/current image to the reference image in accordance with a predetermined comparison metric;
- invoking a first alarm condition when the predetermined comparison metric indicates a threshold proportion of the updated/actual/current image does not match the corresponding proportion of the reference image.

In a fourth aspect the present invention accordingly provides a method of detection comprising the steps of:

- determining a reference image of an object scene comprising a recording of at least one object image feature;
- determining an updated/actual/current image of the object scene comprising a recording of at least one object image feature;
- comparing the updated/actual/current image to the reference image in accordance with a predetermined comparison metric;
- invoking a second alarm condition when a portion of the updated/actual/current image does not match the corresponding portion of the reference image during a continuous time interval.

In a fifth aspect the present invention accordingly provides a method of detection comprising the steps of:

- determining a reference image of an object scene comprising a recording of at least one object edge;
- determining an updated/actual/current image of the object scene comprising a recording of at least one object edge;
- comparing the updated/actual/current image edges to the reference image edges in accordance with a predetermined comparison metric;
- invoking a first alarm condition when one or more portions of the updated/actual/current image does not match the corresponding one or more portions of the reference image during a continuous time interval.

Preferably the method further comprises the steps of:

- determining the total portion of the updated/actual/current image which contributes to invoking the first alarm condition; and
- invoking a second alarm condition when the determined portion of the updated/actual/current image exceeds a threshold proportion of the updated/actual/current image.

In a sixth aspect the present invention accordingly provides a computer program product comprising:

- a computer usable medium having computer readable program code and computer readable system code embodied on said medium for conducting a detection analysis within a data processing system, said computer program product comprising:
- computer readable code within said computer usable medium for performing the method steps of any one of aspects one to five of the invention.

In a seventh aspect there is provided an apparatus for carrying out the method of any one of aspects one to five of the invention.

In an eighth aspect the present invention accordingly provides a device for detecting a characteristic of a detection region, said detection region associated with a detecting direction of said device, said device comprising:

- detection means to detect said characteristic; and
- tamper monitoring means to monitor said detecting direction of said device.

Preferably, said tamper monitoring means generates a signal on a change of detecting direction of said device.

Preferably, said tamper monitoring means monitors said change in said detecting direction by image processing means.

Preferably, said image processing means comprises imaging means to view a viewing region related to said detecting direction, said image processing means operable to detect changes in said viewing region corresponding to a change in said detecting direction of said device.

Preferably, said imaging means also comprises said detection means.

Preferably, output generated by said detection means is stored.

In a ninth aspect the present invention accordingly provides a method for monitoring for the alteration or tampering of a detection device, said detection device operable to detect a characteristic of a detection region, said method comprising the steps:

viewing a viewing region related to a detecting direction of said detection device; and determining a change in said viewing region associated with a change in said detecting direction.

Preferably, said determining step comprises:

detecting a change of an object state from an initial state, said object located in said viewing region and displayed in a plurality of sequential images associated with said viewing region, said detecting step further comprising:

comparing a measure over a predetermined portion of each of said images corresponding to an object's initial state with a reference value of said measure computed when said object is in said initial state to generate a comparison value for each of said images; and generating a signal indicating that said object state has changed when a predetermined number of said comparison values generated for each of said images do not meet a predetermined criterion.

Preferably, said detection device further comprises imaging means to perform said viewing of said viewing region and generate said plurality of sequential images.

Preferably, said detection device is dependent on said detecting direction.

In a tenth aspect the present invention accordingly provides a method for determining a contrast measure for an image; said method comprising the steps of determining a plurality of intensity measures associated with a plurality of regions of said image;

calculating a frequency value for each of a plurality of intensity ranges in respect of said plurality of intensity measures; and determining said contrast measure based on said frequency values.

Preferably, said step of determining a contrast measure comprises determining a first frequency value corresponding to a maximum intensity range and calculating the difference between this value and a second frequency value corresponding to a minimum intensity range.

Preferably, said first and second frequency values are above a predetermined threshold.

In an eleventh aspect the present invention accordingly provides a method for compensating for contrast changes in an image change detection method, wherein said image change detection method is based upon a comparison of a current image with a reference image, said method comprising the steps of:

determining a contrast measure for said current image;

determining an updated reference image based upon said contrast measure; and comparing said current image with said updated reference image.

In an embodiment of the present invention there is provided an apparatus adapted to monitor for the alteration or tampering of a detection device; said apparatus comprising:

processor means adapted to operate in accordance with a predetermined instruction set, said apparatus, in conjunction with said instruction set, being adapted to perform the method steps of aspect nine of the invention.

In another embodiment of the present invention there is provided an apparatus adapted to determine a contrast measure for an image; said apparatus comprising:

processor means adapted to operate in accordance with a predetermined instruction set, said apparatus, in conjunction with said instruction set, being adapted to perform the method steps of aspect ten of the invention.

In yet another embodiment of the present invention there is provided an apparatus adapted to compensate for contrast changes in an image change detection method, said apparatus comprising:

processor means adapted to operate in accordance with a predetermined instruction set, said apparatus, in conjunction with said instruction set, being adapted to perform the method steps of aspect eleven of the invention.

In further embodiments the present invention also provides computer program products comprising:

a computer usable medium having computer readable program code and computer readable system code embodied on said medium for one or more of:

monitoring for the alteration or tampering of a detection device;

determining a contrast measure for an image;

compensating for contrast changes in an image change detection method, within a data processing system, said computer program product comprising computer readable code within said computer usable medium for performing the method steps of any one of aspects nine to eleven of the invention.

BRIEF DESCRIPTION OF THE DRAWINGS

Illustrative embodiment of the present invention will be discussed with reference to the accompanying drawings wherein.

In the following description, like reference characters designate like or corresponding parts throughout the several views of the drawings.

DESCRIPTION OF ILLUSTRATIVE EMBODIMENT

Further scope of applicability of the present invention will become apparent from the detailed description given hereinafter. However, it should be understood that the, detailed description and any specific examples, while indicating embodiments of the invention, are given by way of illustration only, since various changes and modifications within the spirit and scope of the invention will become apparent to those skilled in the art from this detailed description.

Figure 1:
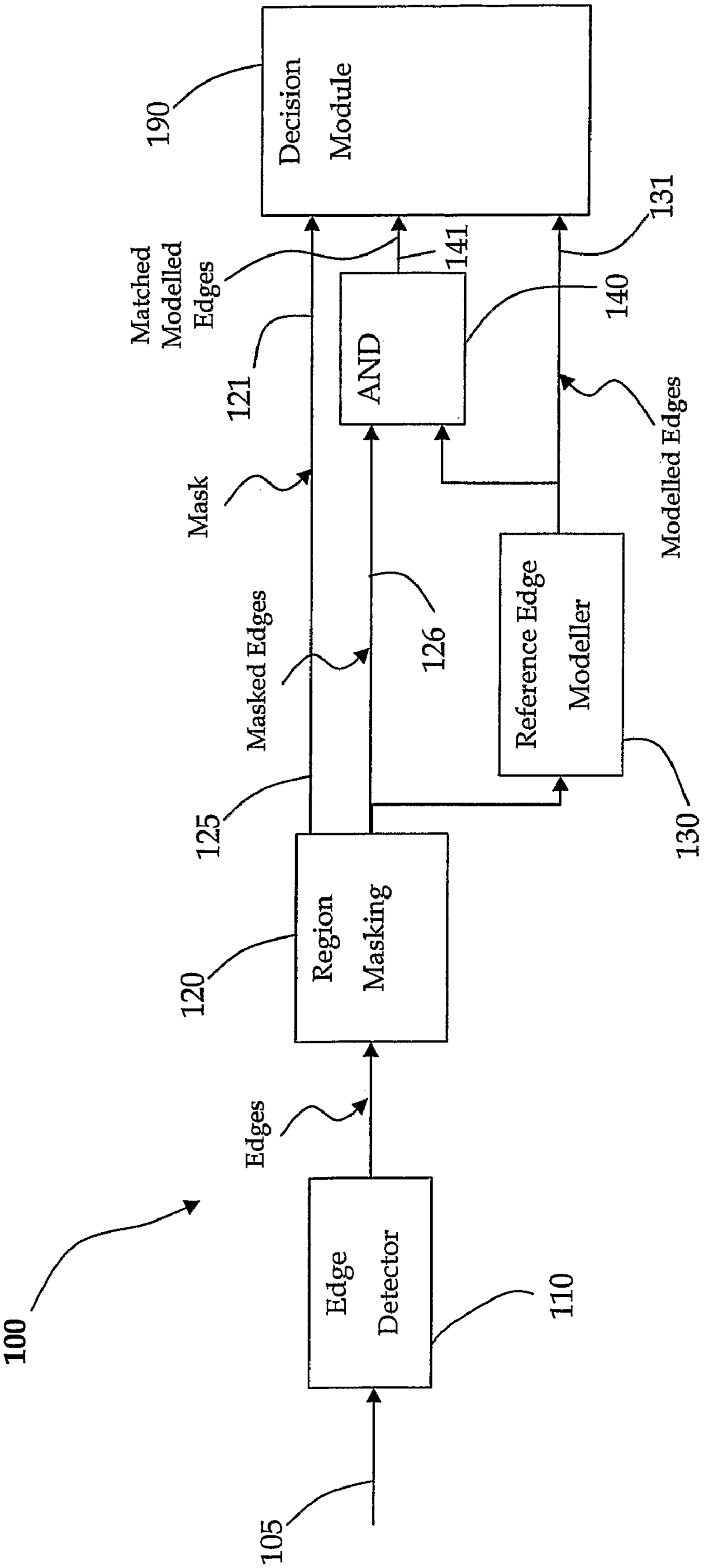
FIG. 1 is a functional block diagram of a method of detecting a change of state of the object according to a first embodiment of the invention.

Referring now to FIG. 1, there is shown a functional block diagram of a system 100 embodying a method for detecting change of state of an object in a sequence of images. In this embodiment the invention is applied to a digital video signal 105 which is comprised of a sequence of individual images or frames which each may be represented as an array of pixels corresponding to measured intensities by a digital CCD camera or alternatively an analogue camera whose output has been further digitised.

The sequence of images is first processed by edge detector module 110 which detects edges of the objects within the image by use of a Sobel filter that has been set with an appropriate threshold. Whilst in this embodiment a Sobel edge filtering function has been used, other edge detection functions such as a Canny filter may be used. As would be appreciated by those skilled in the art, any image processing function which is substantially illumination invariant and hence substantially insensitive to changes in intensity may also be employed. Some illustrative examples of other image processing techniques, that may be utilised either individually or in suitable combination include the use of colour information rather than intensity information, since this has less dependence on illumination intensity, the use of a "homomorphic" filtered image, which essentially removes illumination dependence from the scene or the use of a texture measure which will determine the visual texture of the scene in the vicinity of each pixel position.

Region masking module 120 allows an operator of the system to select a number of objects within the digital video signal which in turn corresponds to selecting these objects within each frame or image which make up the digital video signal. Typically this will involve selecting those pixels which represents the object including its boundary. In this embodiment, the region masking module 120 allows a user to select all pixels within an arbitrary closed freehand curve, this process being repeated for each set of pixels corresponding to an object. In this way a number of objects may be selected within a given viewing area. In the case of a museum or art gallery monitoring system, the objects selected would correspond to those valuables or artefacts for which an alarm is generated if movement or tampering of the artefact is detected.

For each selected object, region masking module 120 generates a mask 125 and respective masked edges 126 corresponding to a portion and hence a pixel subset of the image which corresponds to each object. In this embodiment masked edge information 126 is those pixels within the masked pixel subset which contain an edge as determined by the Sobel filter applied in the edge detector module 110.

To determine reference edge characteristics or modelled edges 131, to which the edge characteristics of subsequent images can be compared to, the reference edge modeller 130 performs a moving average on masked edge information 126. This involves computing the percentage of time each of the pixels contains an edge during a predetermined learning period. This percentage value is further thresholded, so that for example those pixels which correspond to those defined to have an edge for less than a predetermined percentage of time in the learning period will not form part of the reference edge characteristics or the modelled edges 131 which form an input to decision module 190. This allows an operator to tune the sensitivity of reference edge modeller 130 by varying the threshold value as required.

Clearly, as would be apparent to those skilled in the art, the updating of the reference edge characteristics or modelled edges 131 can be selected by an operator or alternatively these characteristics may be updated automatically according to other changes in the viewing area. The intent of updating the modelled edges 131 is to ensure that a reproducible model of the object being monitored is generated. An automatic process for updating the modelled edges 131 could involve a feedback mechanism to adjust the reference characteristics so that a figure of merit which is fed back to an updater is maintained. This figure of merit could be the number of pixels in the modelled edges 131 for a given object, or the percentage coverage of the object by edge pixels, or the uniformity of that coverage, or alternatively some combination of these factors. A different automatic process, that would not require feedback, could use a measure of the visual texture in the image to determine suitable threshold parameters for both the edge detector 110 and reference edge modeller 130.

The modelled edges 131 are inputted into the alarm decision processor 190 in the form of those pixels which contain an edge after processing for the particular masked portion of the overall image. AND gate 140 selects only those pixels 141 from the masked edges 126 of subsequent frames which correspond to the pixels of the modeled edges 131 as determined by reference edge modeller 130. In this manner, processing time is reduced as analysis is only performed on the subset of pixels known to contain edges in the modelled edge information 131. This information 141 is also inputted into alarm decision processor 190 along with original mask 121 information.

Figure 2:
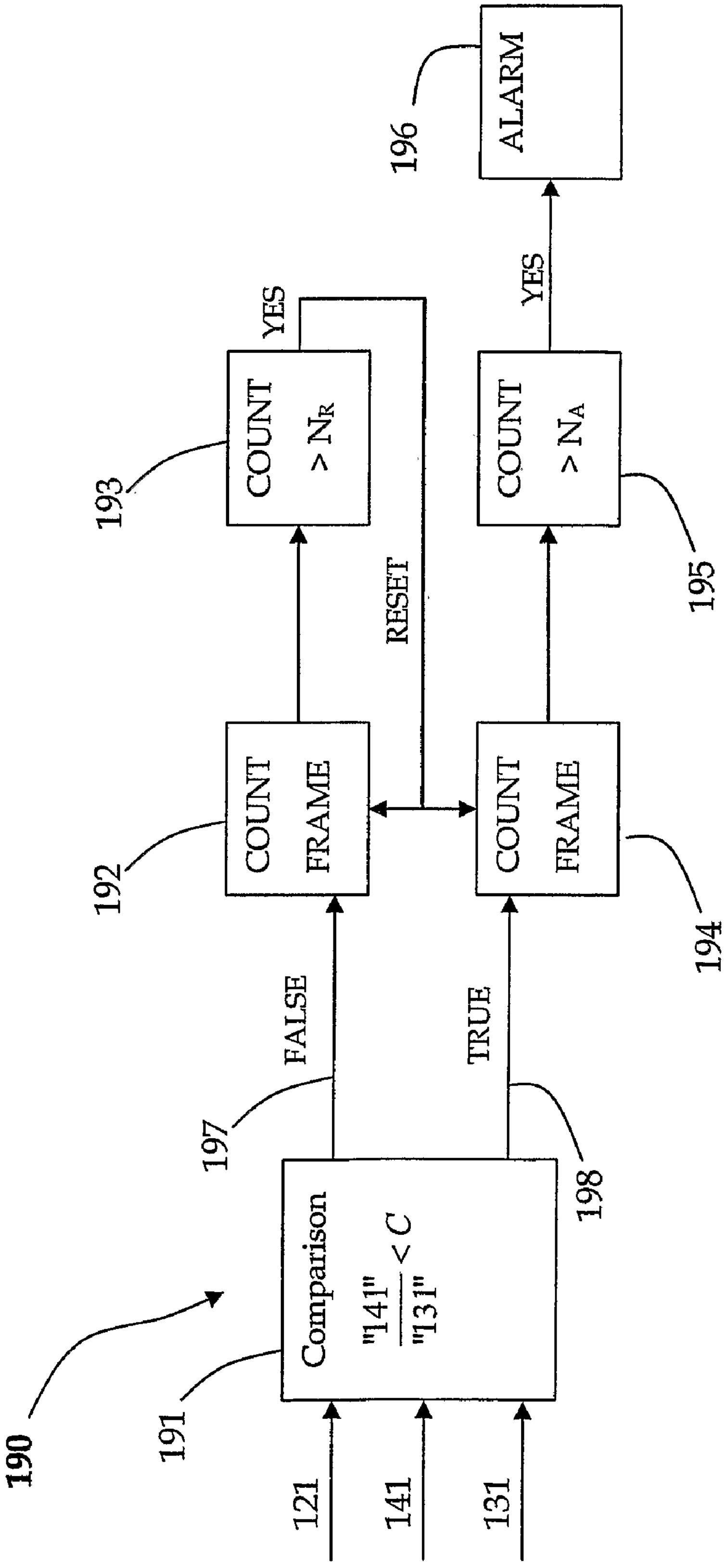
FIG. 2 is a functional block diagram detailing the decision module illustrated in FIG. 1.

Referring now to FIG. 2, a detailed functional block diagram of alarm decision processor 190 is shown. For every object as determined by mask 121, the ratio of number of pixels which contain an edge of the current image 141 to the reference number of pixels which contain edges 131 is computed and compared to a criterion C in comparison module 191. If the ratio or comparison value "141"/"131" falls below a predetermined criterion C (i.e. output TRUE) 198 then alarm counter 194 will count the number of subsequent images or frames where this criterion is satisfied. As an example, for a 90% obscuration limit for an object criterion, C would be set at 10%. Once alarm counter 194 counts $N_A$ images or frames 195 (e.g. at a PAL standard of 25 frames per second and assuming a ten second limit then $N_A$ will be set to 250) an ALARM 196 is generated for that particular object. This feature allows for the object to be totally occluded for a period of time (in this case 10 seconds) before ALARM 196. As would be expected, this is a fairly typical occurrence when people are observing valuables or artefacts in a museum or art gallery.

In the event that the comparison value rises above criterion C (i.e. output FALSE) for a predetermined number of frames or images as determined by $N_R$ then alarm counter 194 is reset. By varying $N_R$, the system can be tuned to determine how much convincing it requires before an object is deemed to be visible again. This may prevent an ALARM 196 occurring, or reset ALARM 196 if it has already occurred. An extension of this is to latch ALARM 196 or record whenever it occurs so that all ALARM 196 events are noted.

Figure 3:
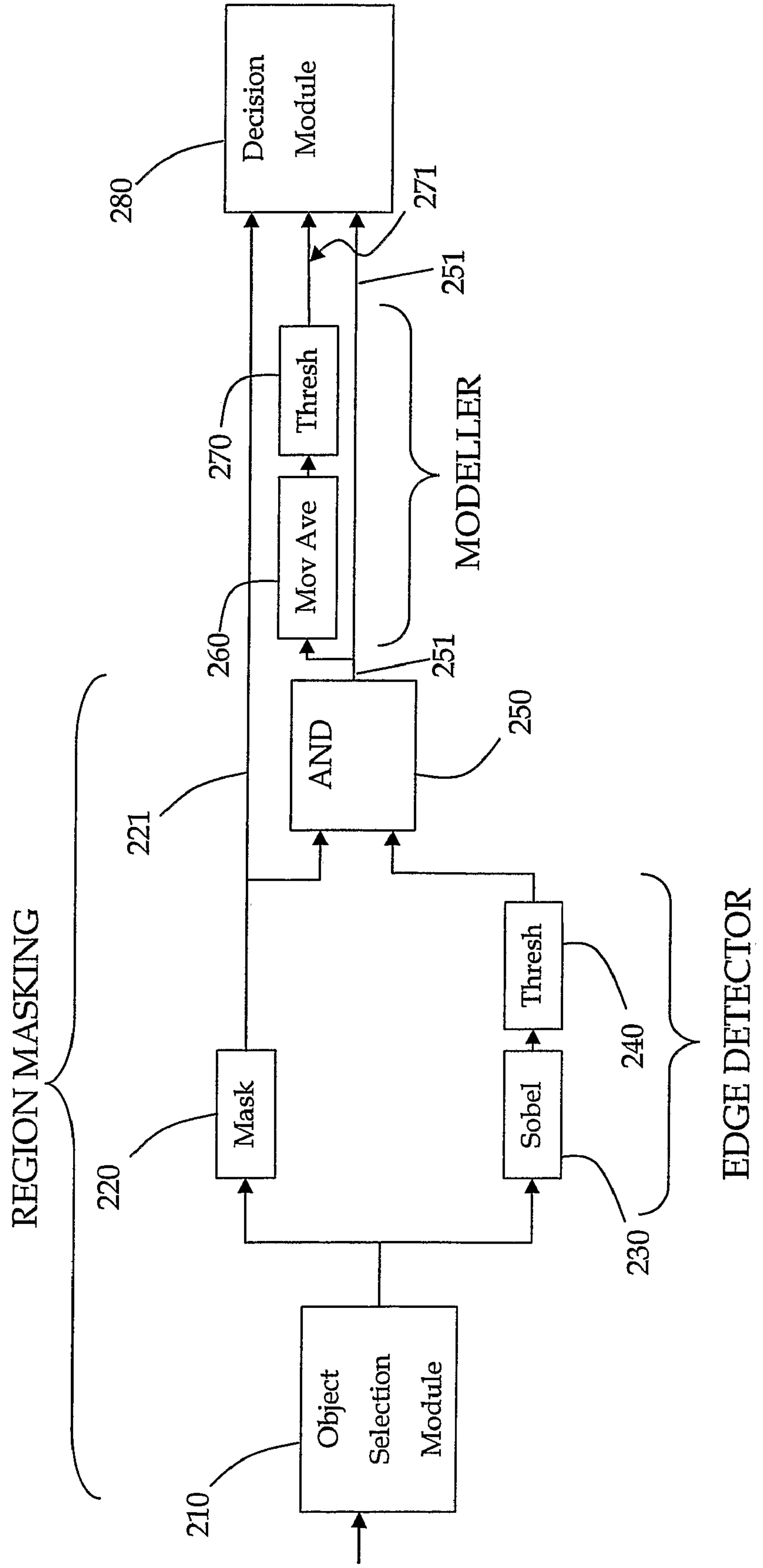
FIG. 3 is a functional block diagram of a method of detecting an object according to a second embodiment of the invention.

Referring now to FIG. 3, there is shown a functional block diagram of a second illustrative embodiment of a system embodying a method for detecting a change of state of an object in a sequence of images 200. This embodiment is similar to that illustrated in FIG. 1 with the region masking function 120 (see FIG. 1) substantially equivalent to object selection module 210, mask module 220 and AND gate 250. Furthermore edge detector module 110 (see FIG. 1) is substantially equivalent to the combined Sobel filter 230 and associated threshold module 240. The output of AND gate 250 are respective masked edges 251 corresponding to a portion and hence a pixel subset of the image which corresponds to the object selected by selection module 210. However, a second AND gate corresponding to AND gate 140 (see FIG. 1) is not required due to the use of a Hausdorff distance comparison measure being performed in alarm decision processor 280.

The Hausdorff distance is defined for two finite point sets $A=\{a_1, \ldots, a_p\}$ and $B=\{b_1, \ldots, b_q\}$, as $$H(A, B)=\mathrm{Max}(h(A, B), h(B, A))$$

where $$h(A, B) \max_{a \in A} \min_{b \in B} \| a-b$$

and ||.|| is some underlying norm on the points of A and B (e.g., the L2, or Euclidean norm).

The function h (A, B) is called the directed Hausdorff distance from A to B. It identifies the point a∈A that is farthest from any point of B and measures the distance from a to its nearest neighbor in B (using the given norm ||.||), that is, h (A, B) in effect ranks each point of A based on its distance to the nearest point of B and then uses the largest ranked such point as the distance (the most mismatched point of A). Intuitively if h (A, B)=d, then each point of A must be within distance d of some point of B, and there also is some point of A that is exactly distance d from the nearest point of B (the most mismatched point)." The Hausdorff distance H (A, B) is then simply the maximum of the two directed Hausdorff distances h (A, B) and h (B, A).

By using the Hausdorff distance as a comparison measure, the edge characteristics of the reference image 271 are compared directly to those of the current image 251. The Hausdorff distance tests how well a model fits the image, as well as how well the image fits the model. Although these two tests seem identical, the following example highlights the importance of considering both aspects.

Consider the scenario where the valuable to be protected is a single, blank sheet of A4 paper. If the user selected a region slightly larger than the piece of paper, the edge model would consist of only four edges, ie the edges of the piece of paper. Now, if this "valuable" was replaced by piece of A4 paper but with a small picture on it, the current image edge map would consist of the four edges of the piece of paper, along with the edges of the picture on the paper. This scenario is similar to a thief stealing an artwork and replacing it with a replica—most of the original content is accounted for, but there are some differences. Now, the reverse partial Hausdorff distance (i.e., how well the model fits the image) would not return any difference, as all four edges in the model are accounted for by the edges of the replacement A4 paper (the AND-based matching method would not detect any differences either). However, the forward partial Hausdorff distance (i.e., how well the image fits the model) would detect that the picture edges were not present in the model.

This added ability means that to escape detection, a thief would have to replace the valuable with an exact replica, placed in exactly the same position and orientation.

By way of explanation, this example serves to define what is meant herein by detecting change of object state, whether that be detecting the actual movement of an object or, determining discrepancies between stored reference images and images of the object being captured under surveillance where, the object may have been tampered with or altered, for example, by way of replacing the object with a replica in an extended time interval between capturing the reference images of the original object and capturing images of the replica object.

Figure 4:
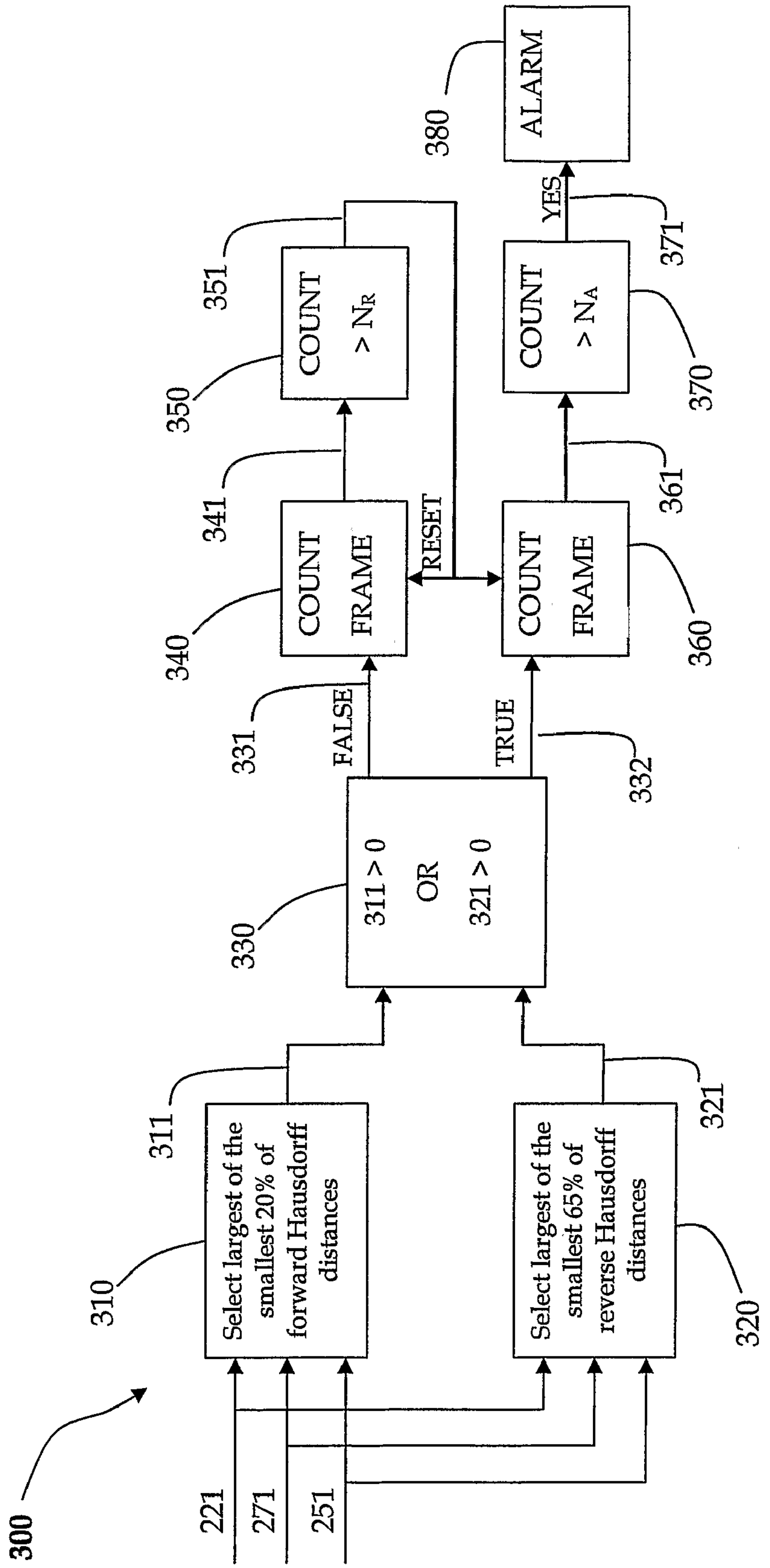
FIG. 4 is a functional block diagram depicting in detail the decision block module illustrated in FIG. 3.

Referring to FIG. 4, there is shown a detailed breakdown of the decision module 280. In this embodiment an extension of the directed Hausdorff distance is used wherein a list of forward and reverse partial Hausdorff distances are calculated and ranked. In the case of the forward directed distance h (A, B), instead of calculating the point a which is the maximum distance from a point b in B, calculate the partial Hausdorff distance $h_a$ (A, B) for each point a in A and denote the K-th ranked value in this set of distances as $h_K$ (A, B). Similarly for the reverse directed Hausdorff distance h (B, A), calculate the reverse partial Hausdorff distance $h_b$ (B, A) for each point b in B and denote the K-th ranked value in this set of distances as $h_K$ (B, A).

Forward distance calculation module 310 determines $h_{20\%}$ (A, B), the K-th ranked value of the forward partial Hausdorff distance corresponding to 20% of the total number of pixels being compared. This value 311 is inputted to comparison module 330 and if it is greater than 0 a TRUE signal 332 is generated and alarm counter 360 will commence counting frames. This in effect tests whether more than 20% of the model is present in the image as by definition $h_{20\%}$ (A, B) will be 0 if this is the case.

Reverse distance calculation module determines $h_{65\%}$ (B, A), the K-th ranked value of the reverse partial Hausdorff distance corresponding to 65% of the total number of pixels being compared. This value 321 is inputted into comparison module 330 and if it is greater than 0 a TRUE signal 332 is generated and alarm counter 360 will commence counting frames. Similar to the forward partial distance calculation, this in effect tests whether more than 65% of the image is in the model as in this case $h_{65\%}$ (B, A) will be by definition equal to 0.

Similar to the alarm generation section described in FIG. 2, once the counted number of images or frames corresponding to a TRUE signal 332 has exceeded $N_A$ 370, where $N_A$ will be set according to the frame rate and time limit, then ALARM 380 is generated for that particular object or region selection. Alarm counter 360 can then be reset by a FALSE signal 331 from comparison module 330 which occurs for $N_R$ frames 350. Once again, this feature provides for substantial differences between the object and the model for a pre-determined period of time being catered for. This may occur if the object were to be totally occluded for a short period of time. As would be clear to those skilled in the art, the percentages used for both the forward and reverse partial distance calculations can be tuned according to the requirements of the detection systems.

These illustrative embodiments of the present invention provide a simple but extremely effective system for protecting valuables in a static scene. It has been shown to accurately detect the removal of protected items in scenes ranging from a sterile indoor environment to an outdoor scene on a windy day. Given the relatively small number of assumptions and the real-time operation achievable due to the simplicity of the algorithm the present invention may be applied successfully in a wide range of situations.

Figure 5:
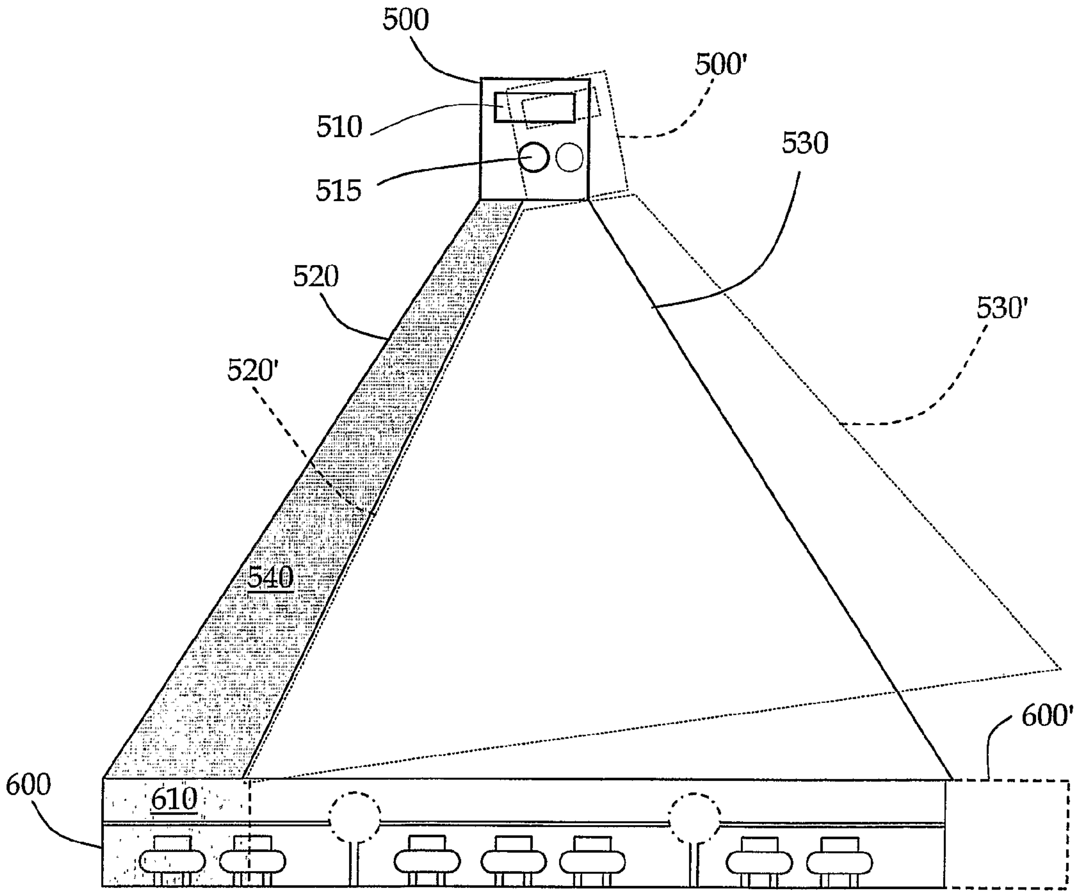
FIG. 5 is a figurative view of a third embodiment of the invention depicting the effects of change of orientation.

Referring now to FIG. 5, there is shown a device 500 for detecting in a given detection region 600 according to another illustrative embodiment of the present invention. In this illustrative embodiment device 500 comprises a PIR element 510 operative to detect any infra-red emissions in a field of view whose extent ranges from left boundary 520 (when viewed front on) to rightmost boundary 530 with a view to securing detection region which comprises car park area 600.

Whilst in this embodiment the present invention has been illustrated with regard to a PIR detector, as would be clear to those skilled in the art the invention can also be applied to those detection or monitoring systems which are initially aligned and orientated to measure a characteristic in a detection region.

As is shown figuratively, detection device 500' whose orientation has been changed with respect to correctly aligned device 500 now views a substantially different detection region 600'. Accordingly, the new field of view ranging between left boundary 520' and 530' does not encompass region 540 which corresponds to area 610 of car park 600 not being viewed thereby resulting in this area being insecure. As would be clear to those skilled in the art, the field of views described herein extend in three dimensions having a length, width and depth.

Figure 6:
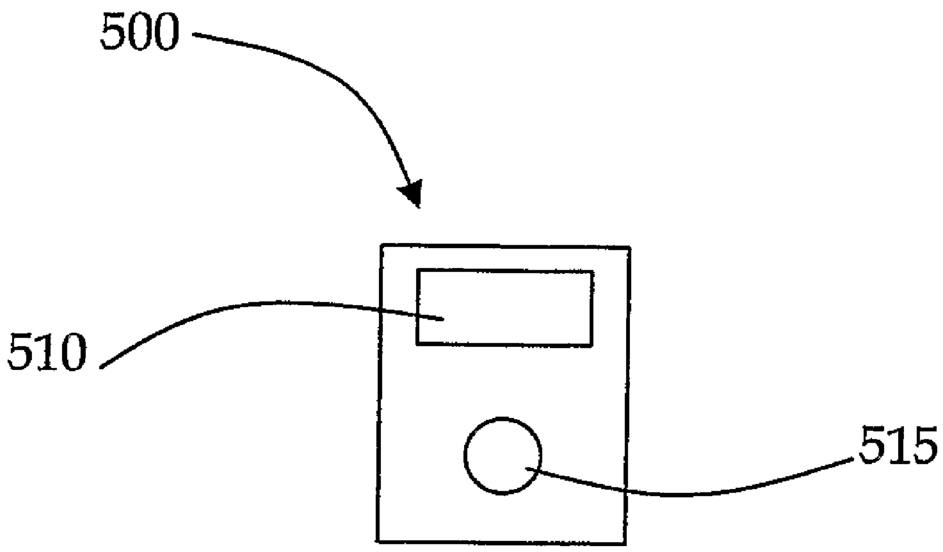
FIG. 6 is a detailed front view of the invention illustrated in FIG. 5.

Referring now to FIG. 6, detection device 500 is illustrated in greater detail. PIR detector 510 may provide an alarm signal if any changes in heat emissions above a predetermined threshold are sensed within the detection regions. These systems are well-known in the art of monitoring and security systems and may be tailored to detect infra-red emissions within certain wavelength bands. Mounted below PIR detector 510 is a standard CCD camera 515 which functions to capture an image of the area that substantially agrees with the detection region view by PIR detector 510.

As the orientation of CCD camera 515 is fixed with respect to the orientation of PIR detector 510, any changes in the orientation of PIR detector 510 may result in a different image being viewed by CCD camera 515. Monitoring of this image change results in an alarm signal being generated that indicates that monitoring device 500 has been tampered with.

Whilst in this illustrative embodiment CCD camera 515 is substantially co-aligned with PIR detector 510 to view a similar region this is only one convenient embodiment. Clearly, as long as the orientation of CCD camera 515 remains fixed in relation to that of PIR detector 510, then any tampering with the alignment of PIR detector 510 may be detected by CCD camera 515. Additionally, there may be multiple PIR detectors that are collocated with respect to a single CCD camera 515.

Change detection algorithms that are particularly suited to detecting changes in the region viewed by CCD camera 515 have already been described herein with reference to FIGS. 1 to 4. In one form, this algorithm detects changes of an object state within a plurality of sequential images such as would be captured by CCD camera 515. As noted previously a feature of this change detection algorithm is that it is substantially illumination invariant so that changes in the general lighting of the viewed region do not trigger a false alarm condition.

For this application the change detection algorithms described previously with reference to FIGS. 1 to 4 are modified by not requiring a user to select a region of interest within a region being viewed. Accordingly, the default behaviour would be to detect if the whole image corresponding to the entire viewing or detection region has changed this further corresponding to movement of monitoring device 500. Alternatively, in another embodiment a user may select a region of interest within the region being viewed which focuses on an object or objects that are known to remain stationary.

As this change detection algorithm is dependent in one embodiment on the detection of edges within the image a further low contrast detector may be included in the algorithm to ensure that the change detection algorithm operates in conditions where there is adequate image contrast.

In one embodiment, the low contrast detector determines a histogram of the whole image in terms of frequency of pixel intensities for a given intensity bin size or range. The difference between the maximum and minimum intensities for those bins which have a frequency of occurrence above some minimum threshold provides a contrast measure that is substantially insensitive with respect to point sources such as might occur with a generally low contrast region such as a car park at dusk which may have a number of lights operating.

When low contrast conditions are detected the alarm signal provided by the change detection algorithm is ignored or alternatively the change detection algorithm is bypassed. When contrast is restored the change detection algorithm resumes normal operation. As a reference image is retained by the change detection algorithm an alarm signal may be generated once contrast is restored if there has been any tampering with the alignment of device 500.

Other modifications to the change detection algorithm which may be incorporated comprise the ability to compensate for sudden changes in lighting which may occur when an area illuminated by a number of lights are turned off, resulting in the edge features of the image changing as the area is now only illuminated by background lighting. This may result in a false alarm condition being generated.

To overcome this issue, a number of reference images may be stored which correspond to different general lighting conditions. If a comparison between a first stored reference image results in an alarm condition then a further comparison is made with a subsequent reference image corresponding to different lighting conditions. If after this comparison, the alarm condition still exists, then a general alarm is flagged. Clearly, this use of a number of reference images which each corresponds to a change in the ambient conditions is equally applicable to those embodiments of the present invention which detect the change of an object state from an initial state as described with reference to FIGS. 1 to 4.

Clearly, this principle may be applied to incorporate any number of reference images and as this comparison may be made essentially instantaneously this does not add significantly to the real time performance of the change detection algorithm. The storing of these reference images would be incorporated into the setup of device 500.

Although in this embodiment of the present invention a CCD camera and associated change detection algorithm are employed to monitor the change of detecting direction of device 500 clearly other tamper monitoring means are contemplated to be within the scope of the invention. One example comprises a collimated detector incorporated with device 500 which detects emitted light from an alignment laser. If the laser is no longer detected this would imply that the detector is no longer in line with the laser and hence the orientation of device 500 has changed. Another example of a suitable monitoring device would be an Inertial Measurement Unit (IMU) fixedly located with respect to device 500 which would directly measure the geospatial orientation and provide an alarm signal corresponding to tampering when the orientation changes.

In another embodiment, the CCD camera may form both the detector which views the detection region and the tamper monitoring means which determines any changes in the viewing direction of the detector. Separate algorithms based on the image processing methods described herein or otherwise would then be employed to process the raw output image data from the CCD camera.

In this embodiment, a first “tamper monitoring” algorithm is tailored to detect those changes which correspond to a change of viewing direction of the detector, for example by concentrating on a fixed object of known orientation. A second separate algorithm would then be customised to determine if an object of interest is missing from the detection region. Alternatively, the CCD camera may simply record and store the images for later review by security personnel with an alarm only being generated when a change of the viewing direction of the detector has been determined by the "tamper monitoring" algorithm.

Throughout the description it will be understood that the following terms may be interpreted as follows:

"object scene" may comprise a region of interest in a field of view containing an object such as a valuable, for example, a painting in a museum;

"object image feature" may comprise intensity or some other image attributes etc but most preferably object edges;

"predetermined comparison metric" may comprise logical AND or preferably the "Hausdorff Distance" in the preferred embodiment using image edges;

the term "portion" does not necessarily correspond to the "proportion". A "portion" can be any part of the image. A "portion" could also be expressed as a subset of the pixels of a recorded image.

While the present invention has been described in connection with specific embodiments thereof, it will be understood that it is capable of further modification(s). This application is intended to cover any variations, uses or adaptations of the invention following in general, the principles of the invention and comprising such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the above disclosure. Various modifications and equivalent arrangements are intended to be included within the spirit and scope of the invention and the disclosure herein. Therefore, the specific embodiments are to be understood to be illustrative of the many ways in which the principles of the present invention may be practised.

Where stated in the above disclosure, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof."

The invention claimed is:

1. A method of detecting change of state of an object scene containing an object of interest, the method comprising:

a) obtaining a reference image of the object scene containing the object;

b) analyzing the reference image to detect edges corresponding to at least the object;

c) determining a reference set of points corresponding to a plurality of edges detected in the reference image;

d) obtaining a subsequent image of the object scene;

e) analyzing the subsequent image to detect edges;

f) determining a subsequent set of points corresponding to a plurality of edges detected in the subsequent image;

g) comparing a position of points in the reference set of points relative to a position of points in the subsequent set of points; and h) in the event that a result of step (g) meets at least one predefined criterion:

determining that there is a change in position of at least one point within the subsequent set of points relative to the reference set of points; and commencing an alarm counter for triggering an alarm.

2. A method in accordance with claim 1, wherein the method further comprises:

repeating steps (d) to (g); and incrementing the alarm counter if a result of the step (g) meets at least one predefined criterion.

3. A method in accordance with claim 1, wherein the method further comprises:

repeating steps (d) to (g); and incrementing a reset counter if a result of the step (g) meets at least one predefined reset criterion.

4. A method in accordance with claim 3, wherein the method further comprises resetting the alarm counter in the event that the reset counter reaches a predetermined threshold.

5. A method in accordance with claim 2, wherein the method further comprises triggering an alarm in the event that the alarm counter reaches a predetermined count.

6. A method in accordance with claim 1, wherein a predefined criterion of the at least one predefined criterion includes a threshold proportion of the subsequent set of points matching or not matching the reference set of points.

7. A method in accordance with claim 6, wherein a predefined criterion of the at least one predefined criterion includes a test of whether a threshold proportion of the reference set of points is present in the subsequent set of points.

8. A method in accordance with claim 7, wherein the threshold proportion is 20%.

9. A method in accordance with claim 6, wherein a predefined criterion of the at least one predefined criterion includes a test of whether a threshold percentage of the subsequent set of points is present in the reference set of points.

10. A method in accordance with claim 9, wherein the threshold percentage is 65%.

11. A method in accordance with claim 6, wherein comparing the reference set of points and the subsequent set of points includes calculating a distance metric, the distance metric derived from at least one of the following:

I) for each of a plurality of points in the reference set, the distance between the point in the reference set of points to each of a plurality of points in the subsequent set of points; and II) for each of a plurality of points in the subsequent set, the distance between the point in the subsequent set of points to each of a plurality of points in the reference set of points.

12. A method in accordance with claim 11, wherein the distance metric is a K-th ranked partial Hausdorff distance.

13. A method in accordance with claim 1, wherein a predefined criterion of the at least one predefined criterion includes the entire reference image not matching the subsequent image.

14. An apparatus for detecting change of state of an object scene containing an object of interest, the apparatus comprising:

an input for receiving a reference image of the object scene containing the object, an input for receiving a subsequent image of the object scene; and a processor configured to:

(a) analyze the reference image to detect edges corresponding to at least the object;

(b) determine a reference set of points corresponding to a plurality of edges detected in the reference image;

(c) analyze the subsequent image to detect edges in the subsequent image;

(d) determine a subsequent set of points corresponding to a plurality of edges detected in the subsequent image;

(e) compare a position of points in the reference set of points relative to a position of points in the subsequent set of points; and (f) in the event that a result of the comparison meets at least one predefined criterion:

determine that there is a change in position of at least one point within the subsequent set of points relative to the reference set of points; and commence an alarm counter for triggering an alarm.

15. An apparatus in accordance with claim 14, wherein the processor is further configured to:

increment the alarm counter in the event that the comparison of the relative position of points in the reference set of points with points in the subsequent set of points meets at least one predefined criterion.

16. An apparatus in accordance with claim 14, wherein the processor is further configured to:

increment a reset counter in the event that the comparison of the relative position of points in the reference set of points with points in the subsequent set of points meets at least one predefined reset criterion.

17. An apparatus in accordance with claim 15, wherein the apparatus is further configured to trigger an alarm in the event that the alarm counter reaches a predetermined count.

18. An apparatus in accordance with claim 14, wherein a predefined criterion of the at least one predefined criterion includes a threshold proportion of the subsequent set of points matching or not matching the reference set of points.

19. An apparatus in accordance with claim 18 wherein the processor is configure to calculate a distance metric points between the reference set of points with points in the subsequent set of points, the distance metric being derived from at least one of the following:

I) for each of a plurality of points in the reference set, the distance between the point in the reference set of points to each of a plurality of points in the subsequent set of points; and II) for each of a plurality of points in the subsequent set, the distance between the point in the subsequent set of points to each of a plurality of points in the reference set of points.

20. An apparatus in accordance with claim 19 wherein the distance metric is a K-th ranked partial Hausdorff distance.

* * * * *